Figure 1:
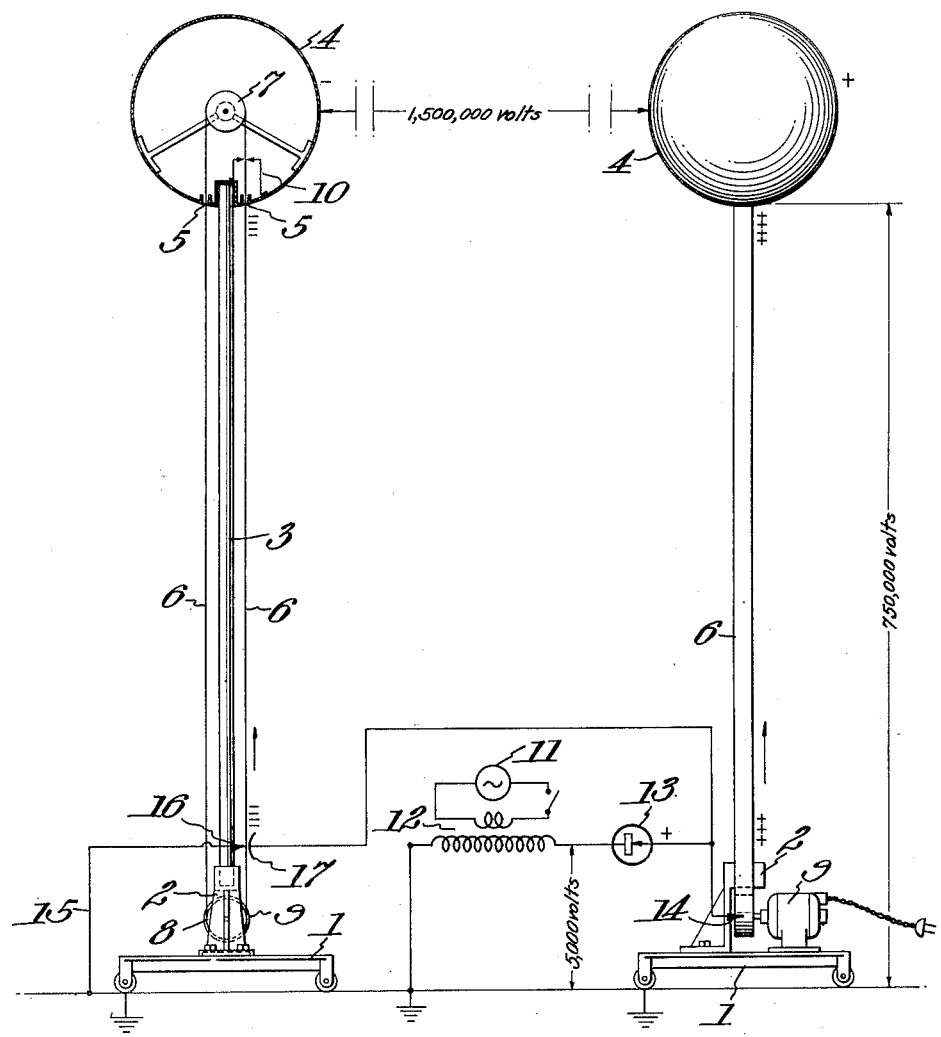

Feb. 12, 1935.  R. J. VAN DE GRAAFF  1,991,236
ELECTROSTATIC GENERATOR
Filed Dec. 16, 1931    4 Sheets-Sheet 1

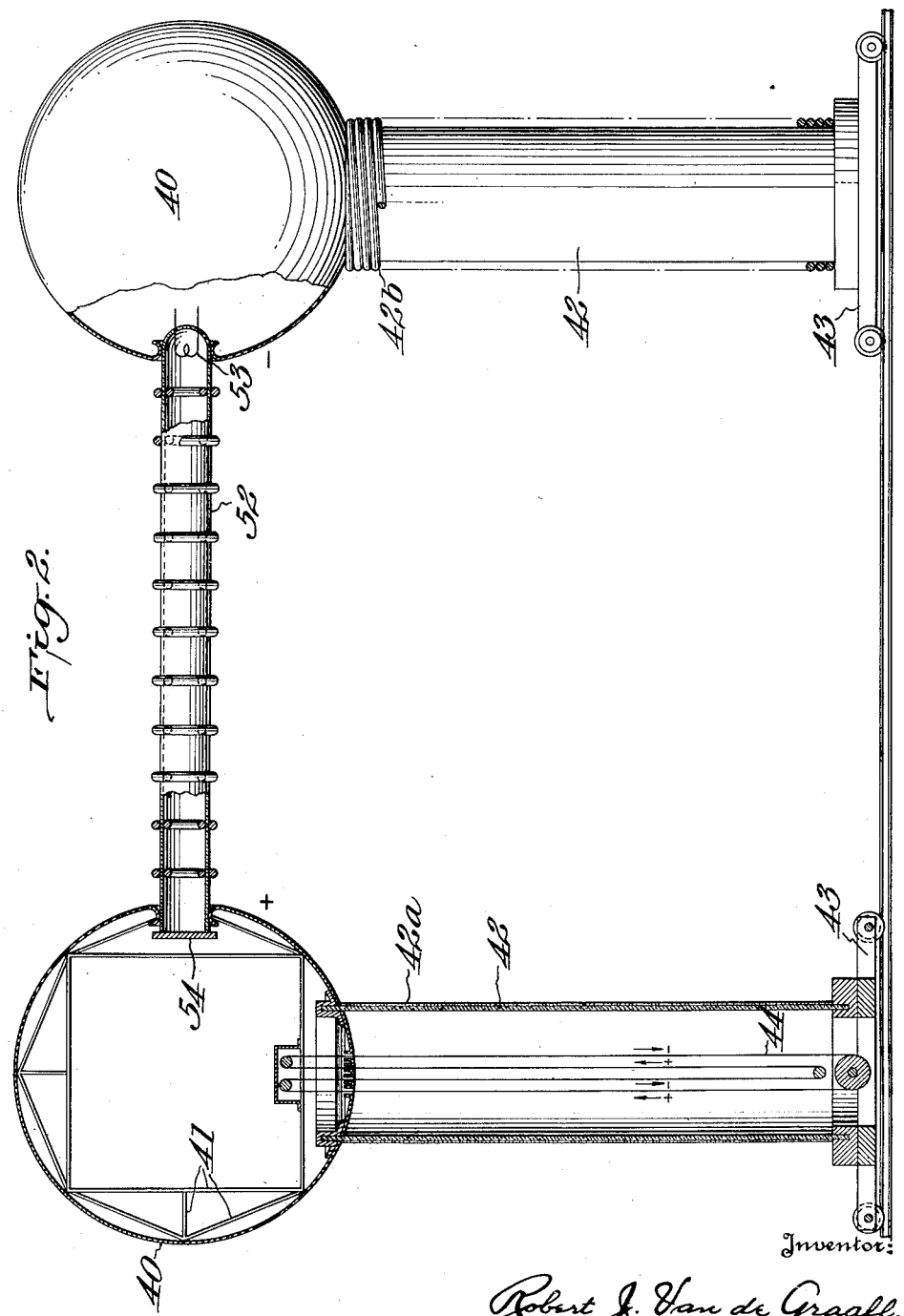

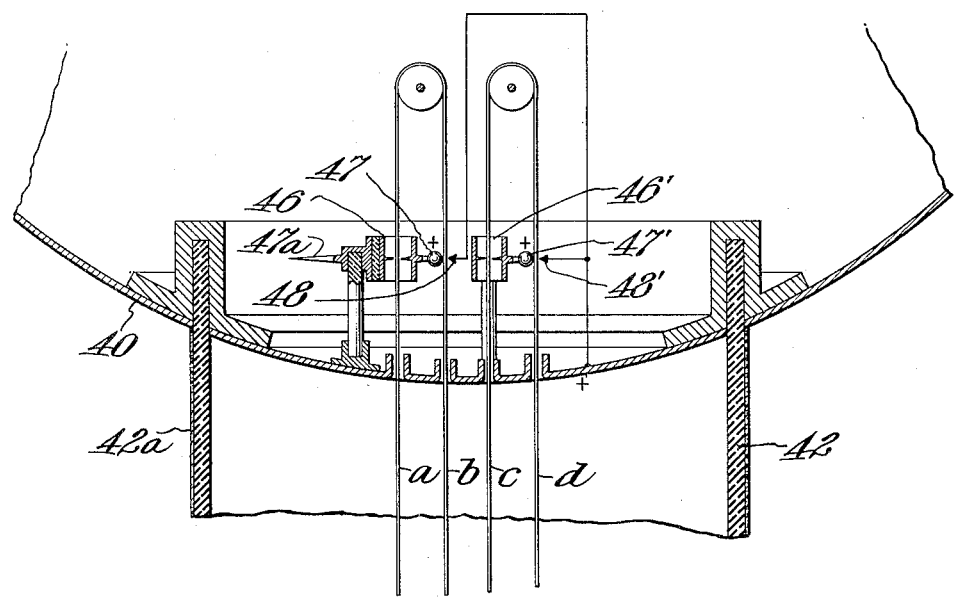
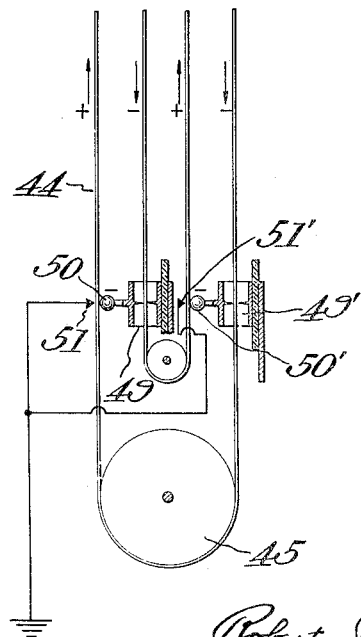

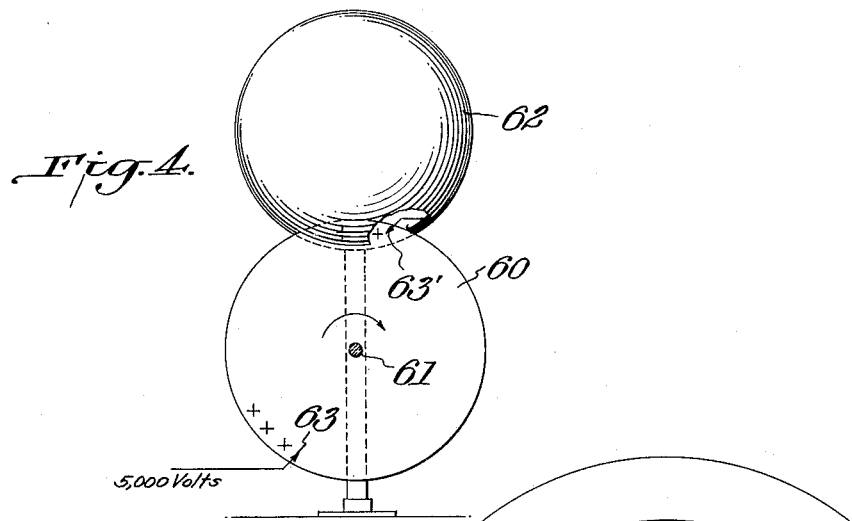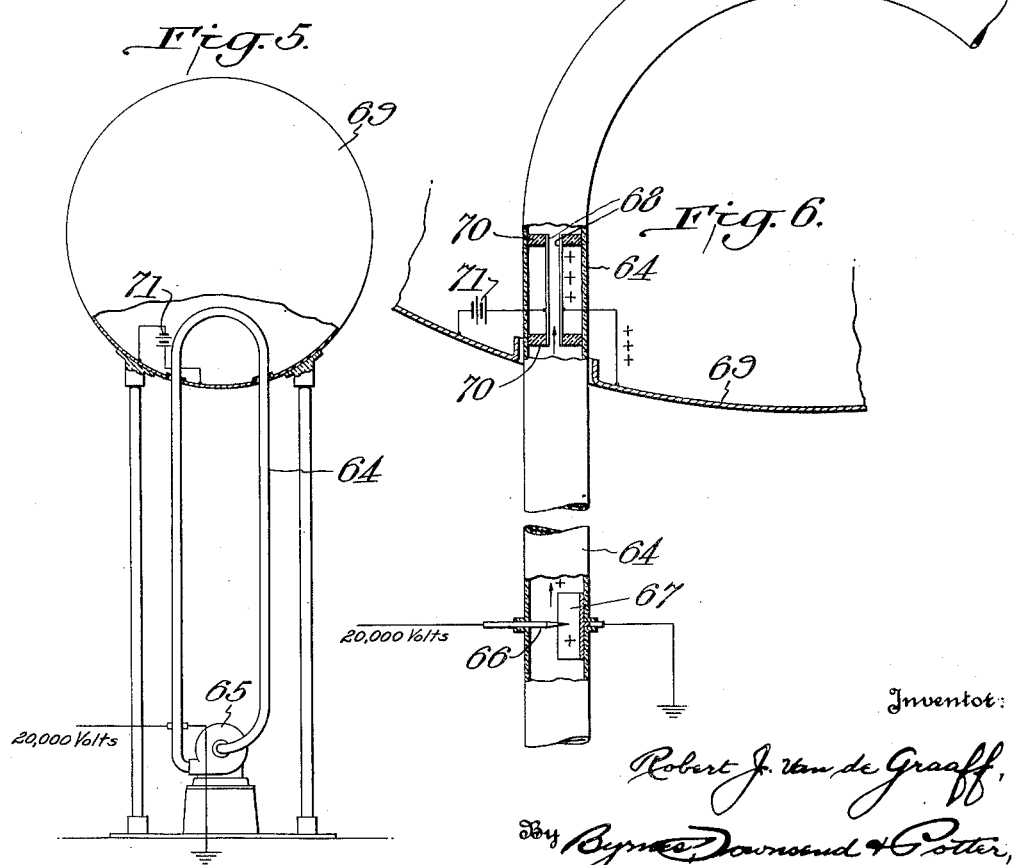

Patented Feb. 12, 1935

1,991,236

UNITED STATES PATENT OFFICE 1,991,236

ELECTROSTATIC GENERATOR

Robert J. Van de Graaff, Cambridge, Mass., assignor to Massachusetts Institute of Technology, Cambridge, Mass., a corporation of Massachusetts Application December 16, 1931, Serial No. 581,499

53 Claims. (Cl. 171—329)

This invention relates to electrostatic generators for the production of direct current voltages, and also to apparatus including an electrostatic generator and the electrical device, such as an X-ray tube, operated thereby.

Influence machines of the general types designed by Holtz and Wimshurst have been employed in the production of direct current potentials, but the output voltages have been restricted to relatively low values. The presence of the conducting wires or bodies required to transfer the electrical charges from the rotating disks to the generator terminals facilitates leakage and limits the maximum voltage that may be established between the generator terminals.

Higher potentials may be obtained by the rectification of alternating current but apparatus of this type is quite costly and, as with influence machines, the maximum available voltage is limited. So far as I am aware, the maximum steady direct current voltage attained by prior workers in this art was about 700,000 volts, and was obtained by the rectification of alternating current.

An object of this invention is to provide an electrostatic generator which will produce steady, direct current voltages of an order substantially higher than any previously obtained by influence machines and/or the rectification of alternating current. An object is to provide a generator in which the electrical charges are established directly upon the electrodes or terminals, as distinguished from prior influence machines in which the charges were collected upon a system of conductors leading to the electrodes. A further object is to provide an electrostatic generator having electrodes in the form of hollow bodies, and non-conducting charge carriers which transfer charges between the interior of the hollow electrodes and a grounded point. More specifically, an object is to provide an electrostatic generator including two hollow electrodes supported on insulator columns, and a charge carrier for each electrode, the charge carriers having the form of silk belts passing over pulleys within the electrodes and driven by motors located at the base of the insulator columns. Other specific objects relate to the provision of high voltage apparatus combining generators of the types stated with the high potential electrical apparatus to be energized thereby.

These and other objects of the invention will be apparent from the following specification when taken with the accompanying drawings, in which, Fig. 1 is a side elevation, with parts in section, of one embodiment of the invention, Fig. 2 is a side elevation of a combined generator and X-ray tube installation, the generator being adapted to produce potentials of the order of several million volts, Fig. 3 is a diagrammatic view of the charge transferring system of the generator shown in Fig. 2, Fig. 4 is a side elevation, with parts in section, showing a unit having a charge carrier of disk form, Fig. 5 is a somewhat diagrammatic fragmentary side elevation, with parts in section, of a unit having a fluid charge carrier, and Fig. 6 is an enlarged fragmentary view of the carrier system of Fig. 5.

Two substantially identical units are shown in Fig. 1, the units being turned at right angles to each other for the better illustration of the structural details at the base of the units. Each unit includes a wheeled supporting base 1 to which is secured a bracket 2 that carries an insulator column 3. The insulators 3 may be, and preferably are, glass rods of a height sufficient to provide adequate insulation between the grounded base 1 and hollow electrodes 4 that are mounted on the rods 3. The exterior surfaces of the electrodes 4 are free from projections or points which would promote leakage and, in general, will be of spherical form.

The lower portion of each electrode is provided with slots 5 for passage of a non-conducting belt 6 that passes over a pulley 7 mounted within the electrodes 4 and a conducting pulley 8 that is located at and driven by a motor 9 on the base 1. The belt 6 is non-conducting and may be silk or a fabric treated with a non-conducting flexible plastic, such as a cellulose ester. Interposed between the two runs of each belt is a solid insulating medium, herein of glass, and comprising the glass rod 3. Within the electrode, brushes or combs 10 are provided adjacent the belt 6, the brushes being electrically connected to the interior of the electrode.

The belts 6 constitute the charge carriers which transfer to the electrodes the electrical charges which are established at the lower ends of the belts. The apparatus for charging the belts is shown diagrammatically in Fig. 1, as an alternating current source 11, a transformer 12, and a rectifier 13 in the secondary circuit of the transformer. The terminal of the secondary which is negative, during cycles when rectifier 13 is conductive is connected to ground and the positive terminal of rectifier 13 is connected to a brush electrode 14 adjacent the portion of the upward run of belt 6 where it engages the lower pulley of the positive electrode unit. At the negative electrode unit, a conductor 15 extends from ground to a brush electrode 16 that is adjacent the lower portion of the upward run of the belt and directly opposite the rounded electrode 17 that is connected to the positive terminal of the rectifier 13. The electrical charges placed on the belts by this low voltage circuit are indicated by the + and − signs adjacent the belts.

It will be apparent that, as each charged belt passes by the brushes 10, the charge passes from the belt to the brush, and thence to the interior surface of the electrode 4. As charges can not remain upon the interior surface of a hollow body, the electrical charges pass to the exterior surfaces of the electrodes. The fact that charges will not accumulate at the interior surface makes it possible to increase the charge or voltage on the electrodes 4 to a value determined only by the form and location of the electrodes. The maximum voltage that may be established between electrodes 4 is limited by the sharpest maximum curvature of the electrode surfaces, and by the spacing of the electrodes from each other and from ground, i. e., from the conducting brackets 2 which carry the rod insulators 3.

The legends applied to Fig. 1 indicate the voltages obtained with one particular generator in which the electrodes 4 were twenty-four inch spheres mounted on seven foot glass rods. With spherical electrodes of this size, leakage from the electrode restricts the maximum voltage on the electrode to about 750,000 volts, thus limiting the voltage between the oppositely charged electrodes to about 1,500,000 volts. The belts 6 were of silk and the rectifier charging system established a relatively low voltage of about 5,000 volts between each brush and its corresponding rounded terminal.

This external source of relatively low voltage for charging the belt is illustrated in the drawings to facilitate a more ready understanding of the method of operation of the device but it will be understood that the machines may be made self-exciting, in which case they may be primed by small stray charges generated by friction or otherwise. Furthermore, it will be apparent that each unit can be made to operate as a motor if a high potential difference is established between the electrode 4 and its grounded base. For example by moving the units to bring the electrodes 4 into contact, and operating the motor 9 of one unit to establish a high potential upon the electrodes, the belt 6 of the other unit will be driven as the electrical charges move upwardly from the grounded base to neutralize the charge established in that unit.

A little consideration of the described apparatus will show that, by decreasing the curvature of the electrode surfaces and increasing the insulation between each electrode and ground, higher voltages may be obtained. The absence of conducting paths between the electrodes, and the transfer of charges to the interior surfaces of the electrodes make it possible to increase the voltages to values of an order not obtainable with any known type of direct current generator.

A generator system operative to produce voltages of the order of several million volts is illustrated in Fig. 2. For convenience of description, it will be assumed that a maximum voltage of about 10,000,000 volts is to be produced between the spherical electrodes 40, i. e., a potential difference of about 5,000,000 volts between each electrode and ground. The electrodes take the form of a thin conducting shell 40 that is supported by an interior framework 41, the conducting shell being free from surface irregularities or projections and having a diameter of about 10 feet. The insulator columns 42 which support the electrodes 40 on the movable bases 43 may be tubular sleeves of non-conducting material, for example, paper or wood veneer impregnated with shellac or an artificial resin. Adequate insulation will be provided when the insulator columns have a length of about fifteen feet.

To insure most efficient operation it is highly desirable to maintain a uniform potential gradient between the electrode and ground along the supporting column 42. This condition will obtain when the insulating support presents high conductivity in horizontal planes and a controlled resistance in vertical planes along the column. By providing a conductive coating upon the surface of the column, the coating being of substantially constant but relatively low conductivity, the leakage flow of current will establish a uniform potential gradient along the column and, since the potential will be substantially constant over any horizontal plane, the lines of force in the space within the column will be substantially linear and parallel to the axis of the column. This leakage coating may take the form of a paint or varnish layer $42^a$, of low conductivity, as shown in Fig. 3 and at the left of Fig. 2, or it may comprise a cord or thread $42^b$ that is rendered slightly conductive by treatment with graphite or India ink, and is wound spirally around the column 42, as shown at the right of Fig. 2.

The gradual potential gradient down the insulating column tends likewise to produce a lowering of the electric field at points on the spherical electrode adjacent the entering portion of the column 42, thus resulting in the location of the most concentrated electric field at a region of the electrode remote from the supporting column.

The charge conveyor system may be of the type previously described but, as illustrated, includes a more efficient arrangement in which the carrier belt 44 is doubled back to provide a plurality of upward runs. The current carrying capacity of such a belt is, for a given belt width, equivalent to that of two simple belts of the type shown in Fig. 1. This method of increasing the current output may be carried further by doubling the charge carrier back and forth to provide additional sections of one upward and one downward run. The current output may also be increased by the use of wider charge carriers or higher carrier speeds.

The collector brushes within the electrodes 40 are insulated from the electrode and the potential difference between the brush and electrode is employed to place on the belt, just before it leaves the hollow electrode, a charge of opposite sign to that brought to the electrode by the belt. The belt does double duty by not only bringing to the electrode charges of one sign but also by carrying away charges of the opposite sign.

As best shown in the diagrammatic view, Fig. 3, the upward run $a$ of belt 44 passes through a sleeve or brush electrode 46 that is supported within but insulated from the hollow electrode. The brush electrode 46 is connected to a rounded terminal 47 that is positioned adjacent the downward run *b* of the belt and opposite a brush or comb electrode 48. A similar arrangement of a brush electrode 46', rounded terminal 47' and brush 48' is provided for the runs *c* and *d* of the other section of the belt. The brush electrodes 48, 48' are connected to each other and to the interior of the electrode 40. At the lower end of the belt, brush electrodes 49, 49' are positioned adjacent the runs *b* and *d*, respectively, of the belt and are connected to rounded terminals 50, 50' adjacent the corresponding upward runs. Brush electrodes 51, 51' are positioned at the opposite faces of the upward runs for cooperation with the rounded terminals, the brushes 51, 51' being connected to each other and to ground.

If the electrode 40 is to be given a positive charge, the upward runs *a* and *c* of the belt 44 carry positive charges to the interior of the electrode. These charges are removed from the belt by the brush electrodes 46, 46', thus placing positive charges on the rounded terminals 47, 47'. The difference of potential thus established between these rounded terminals and the brush electrodes 48, 48' causes a corona or brush discharge from the electrodes 48, 48' thus liberating negative charges that are drawn toward the rounded terminals and, being intercepted by the non-conducting belt 44, some or all of these negative charges are carried away by the departing run of the belt. Obviously, this withdrawal of negative charges from the spherical electrode 40 has the effect of increasing the positive potential of that electrode with respect to ground. At the lower portion of the belt, a similar action places positive charges on the upward runs *a*, *c*, respectively.

In the event that the corona discharge from brushes 48, 48' does not fully neutralize the positive charges arriving on the terminals 46, 46' from the belt, the potential difference between the interior or neutral surface of the spherical electrode 40 and the brush electrodes 46, 46' will tend to increase. Pointed electrodes 47ᵃ extend from the brush electrodes 46, 46' toward the interior of the shell and, by corona discharge, limit the maximum potential difference which may be established between the brush electrodes 46, 46' and the spherical electrode. The discharge from positively charged electrodes 47ᵃ to the interior of the electrode 40 will increase the positive charge on the hollow electrode 40.

These conditions will be best understood if it is kept in mind that the pointed or brush terminal constitutes a terminal having, at the region of its pointed end, a high potential gradient as compared with the potential gradient at the surface of its complementary, relatively rounded terminal. This creates an electric field between the two terminals sufficiently intense to ionize the air with the liberation of free positive and negative charges or ions. By far the greater number of free charges are liberated in the immediate vicinity of the pointed terminal where the potential gradient is highest,—the so-called corona discharge emanated from the point being evidence of their presence. This causes the passage or migration of ions of one sign from the pointed terminal toward the rounded terminal.

If the pointed terminal is negative with respect to the opposing rounded terminal, the free negative charges in the vicinity of the point will be repulsed and driven toward the rounded terminal to be intercepted by the belt. If the pointed terminal is positive it will propel the free positive charges toward the opposing terminal and the belt will collect positive charges. The charges thus become "sprayed", as it were, on the belt from the pointed or brush terminal due to the ionized condition of the air and to the electric forces of the field.

In the embodiment of the invention shown in Fig. 3, the voltage across the terminal is built up by the structures holding the rounded terminals receiving and accumulating the charges which are initially placed upon the belt by friction or from any external source. Due to the friction of the moving belt on the pulley, for example, a small initial charge may be applied to the belt. This will result in the cumulative separation of positive and negative electricity by induction, thus charging the rounded terminals and priming the machine. When the voltage across the terminal gaps is sufficient to cause ionization adjacent the pointed terminal, the apparatus functions in a very definite manner and begins to operate as self-exciting and at full power.

In Fig. 1, however, a strong uni-directional field is impressed across the lower ionization terminals from a source of sustained voltage independent of the belt and pulley and comprising the transformer and rectifier. With excitation supplied in this manner, the apparatus builds up very quickly on the hollow sphere a high voltage charge of a certain and predetermined sign.

The belt is initially primed either by friction or by some other source of small charges. It will be apparent that, after placing an initial small charge on the belt, the apparatus is self-exciting and will rapidly build up to its maximum output.

The high potential difference under which the two electrode units are charged may be utilized to supply direct current or, in fact, continuous current power where desirable to a high voltage, power-consuming device, operatively related to the electrode units, and herein shown as extending between and supported by the electrodes 40, the transmission of power taking place from one generator to the other through this connecting link which thus becomes a power transmission element or line. As an example of such a device, there is shown in Fig. 2 an X-ray tube comprising a glass cylinder 52 having a cathode 53 comprising a filament sealed in one end of the cylinder and having a metal target 54 secured across the opposite end of the cylinder. In the case of a hot filament as shown, emitting electrons, and in the event that the vacuum is high, the power would be transmitted by electrons only. On the other hand, of course, ions of both signs could take part. The ends of the tube extend through openings formed in the surface of the hollow cylinder. The bounding edges of these openings through which the tube enters are provided with a rounded, re-entrant contour to prevent corona discharge thereat. The operators work within the hollow electrodes, suitable doors (not shown) being provided to permit access to the interior of these operating rooms. When closed, the door should continue the continuity of the smooth exterior surface of the electrode to avoid the corona discharge which would take place from sharp edges. The operators are thus fully protected from the high potentials since no charge exists on the interior wall of the electrodes. This is a matter of great convenience as it enables the operator to work in contact with the electrode and avoids the use of external conductors. This feature is particularly important as it would be quite difficult to design conductors for transferring current between the electrodes and an electrical device spaced an appreciable distance from them. If the operator were outside of the electrode, it would be impossible for him to approach within several feet of the charged electrodes.

As shown in Fig. 4, the charge carrier takes the form of a disk 60 of paper, impregnated fabric or other insulating material which is mounted on and rotated by an insulating rod or shaft 61. The upper portion of the disk passes into the hollow electrode 62 through a narrow slit and the charges to be transferred to the electrode are placed on the edge of the disk 60 by a corona discharge electrode 63 that is energized by a relatively low potential source of unidirectional current, which is indicated in Fig. 4 by the legend "5,000 volts", and these charges are removed from the disk by a brush or collector 63'.

As shown in Figs. 5 and 6, the charge carrier is a fluid medium, such as oil, circulated through the endless pipe line 64 by a pump 65. The fluid medium is charged, at the lower portion of the system, by a discharge point 66 which extends into the conduit 64 and terminates adjacent the larger and rounded electrode 67. Condenser plates 68 are arranged within a portion of the conduit 64 which lies within the hollow electrode 69, and washers or baffles 70 compel the moving column of oil to flow between the condenser plates. The condenser is charged by a current source of low voltage, such as a battery 71 of the low current drain type commonly used with vacuum tubes as a plate battery, the battery being connected between one condenser plate and the electrode 69, while the other plate is connected directly to the electrode.

With this arrangement, the moving column of a fluid non-conducting medium receives electrical charges as it passes the pointed electrode 66, and the charges are removed and transferred to the electrode as the medium passes between the condenser plates. If desired, the fluid medium may have fine particles suspended therein to act as the charge carriers, but this is not generally necessary as the charges may be applied directly to the non-conducting fluid. The fluid may be a liquid or a gas or vapor, or a mixture.

The use of conducting spots or zones on a belt or disk type of charge carrier operating in air is, contrary to the prior practice, to be avoided as it results in decreased efficiency due to the lessened effective surface for transferring charges and may materially reduce the maximum voltage that may be established on the electrode or terminal. This will be apparent since a conducting spot or zone on the charge carrier forms, at the instant that it enters the slot in the wall of the electrode, a relatively sharp edged extension of the electrode, thus promoting a corona or leakage discharge from the electrode.

The endless belt, say of the type illustrated in Fig. 1, may be driven by a blast of air, in which case the pulleys may be replaced by curved guide-channels, and the channels may be extended along substantially the full length of the belt as an enclosing housing and providing a passageway along the looped belt for the air. The air is forced into the channel by suitable means and is circulated through the channel carrying the belt around with it.

The described apparatus are illustrative of the operating methods and of appropriate physical structures contemplated by the invention. It will be apparent that other physical structures which may be designed fall within the scope of the invention as set forth in the following claims.

I claim:

1. In high voltage electrostatic apparatus, a pair of spaced apart electrodes, means constituting an insulating support for the respective electrodes, and endless non-conducting charge carriers for transferring charges between ground and the respective electrodes.

2. In high voltage electrostatic apparatus, a pair of mechanically independent and relatively movable units, each unit comprising an electrode, an insulating support for the electrode, an endless non-conducting charge carrier for transferring charges to the electrode, and means at the opposite end of said support for driving said charge carrier.

3. In high voltage electrostatic apparatus, the combination with a hollow electrode, and means for establishing a high direct current potential difference between said electrode and ground, of a high voltage power-consuming device exterior to said electrode and having one end thereof extending through the wall of said electrode.

4. In high voltage electrostatic apparatus, the combination with a pair of hollow electrodes and means for establishing high direct current potentials of opposite sign on the respective electrodes, of a high voltage power-consuming device extending between said electrodes and having the ends thereof structurally connected to the opposing walls of the respective electrodes.

5. In high voltage electrostatic apparatus, a conductive shell of rounded form constituting a hollow electrode and containing an interior operator's room to which access is provided, a column supporting said shell above ground and insulating said shell therefrom, an endless non-conducting charge carrier movable from a point within said shell to a point at the opposite end of said column.

6. The invention as set forth in claim 5, wherein an opening is provided in said shell midway the top and bottom thereof, in combination with a high voltage power-consuming device exterior to said room and having one end thereof connected to said opening in said shell.

7. In high voltage electrostatic apparatus, a pair of conductive shells and constituting each a hollow electrode containing an operator's room, insulating supporting columns for the respective shells, endless charge carriers for transferring charges to the respective shells to impart thereto electrical potentials of opposite sign, an elongated high voltage power-consuming device, and means supporting said device between said shells and with the opposite ends thereof projecting through said shells to the interior thereof.

8. The combination with a hollow electrode, a hollow insulating support for said electrode, and a charge carrier within said support for transferring charges between said electrode and ground, of means establishing a controlled potential gradient along said insulating support.

9. The invention as set forth in claim 8, wherein said support has the form of a cylinder and said means comprises a coating of a material on the wall of said cylinder having a receptivity relatively low as compared with that of said support.

10. The invention as set forth in claim 8, wherein said means comprises a low conductivity conductor wound on the wall of said support.

11. In an electrostatic machine, the combination of a body to be charged, said body being insulated from ground, an insulating charge conveyor, and means supporting said conveyor for movement along an endless path and with a plurality of spaced portions of said conveyor moving into and out of said body, and means for transferring electric charges between said body and each of said spaced portions of said conveyor.

12. In an electrostatic machine, the combination of a body to be charged, said body being insulated from ground, an insulating belt, means supporting said belt for movement along an endless path and with a plurality of spaced portions of said belt moving into and out of said body, and means for charging substantially the entire length of said belt to effect thereby a transfer of charges between the electrode body and points on said belt path spaced therefrom.

13. In an electrostatic machine, the combination of an electrode body insulated from ground, an insulating belt, and means supporting said belt for movement along an endless path and with a plurality of spaced portions of said belt moving into and out of said electrode, means for placing electrical charges on each of said spaced belt portions moving towards said electrode body, and means within the electrode body for transferring to said electrode body the electrical charges carried thereto by the said portions of the belt.

14. In an electrostatic machine, the combination of a hollow electrode body insulated from ground, an insulating conveyor, and means supporting said conveyor for movement along an endless path and with a plurality of spaced portions of said conveyor moving into and out of said electrode, means for placing charges upon that section of each of said spaced conveyor portions which moves towards and into said electrode body, and means for transferring charges of opposite sign from the electrode body to that section of each of said spaced conveyor portions which moves out of said electrode body.

15. In an electrostatic generator, a hollow electrode, an insulating support for the same, endless belt charging means including a plurality of pairs of complementary flights extending into the interior of said hollow electrode, means for driving said endless belt means, and electrode means spaced from said hollow electrode for placing electric charges upon the flights of said endless belt means.

16. The invention as set forth in claim 15, wherein said driving means moves adjacent flights of said belt in opposite directions, and said electrode means places upon a belt flight moving towards said hollow electrode an electric charge of the sign opposite to that of the adjacent belt flight which is moving away from said hollow electrode.

17. In an electrostatic machine, the combination with a hollow electrode, an insulating support for the same, and charge-transferring means within said hollow electrode, of endless belt means for conveying electrical charges to and from the interior of said hollow electrode, said belt means including a plurality of pairs of complementary belt flights passing into and out of said electrode, supporting means for said belt means and including a set of pulleys within and another set of pulleys spaced from said electrode, means for moving adjacent flights of said belt means in opposite directions and charge-transferring electrode means adjacent said belt means and spaced from said hollow electrode.

18. In an electrostatic apparatus, a pair of spaced hollow electrodes of rounded contour, columns supporting and insulating each electrode from ground, traveling means for carrying electric charges of one sign to and into one of said electrodes and charges of the opposite sign to and into the other of said electrodes, and means within each of said electrodes for transferring to the electrode the charges brought thereto by said traveling means.

19. In a high voltage apparatus, an electrode structure comprising a hollow shell with an operator's room contained therein, and means for electrostatically charging the shell.

20. In a high voltage electrostatic apparatus, the combination with an electrode, of a movable charge-carrying means for charging said electrode, an insulating connection between said electrode and a point having a high potential difference with relation to said electrode, and means for establishing a controlled potential gradient along said insulating connection.

21. In a high voltage electrostatic apparatus, the combination with a body to be charged, of an insulating support for the body, a movable charge-conveying medium having a path of movement entering the body in the vicinity of the connection of said support, and means for establishing a controlled potential gradient along said support.

22. An electrostatic machine having a body to be charged, a movable charge-conveying means, means establishing a plurality of paths for said conveying means, each path having an entry into and an exit from said body, and means for transferring electrical charges between said body and said conveying means.

23. The invention as set forth in claim 22, characterized by the fact that the means for transferring electrical charges serves to transfer electrical charges to said body from said conveying means at a plurality of the entering portions of said conveying means.

24. The invention as set forth in claim 22, in which the means for transferring electrical charges serves to transfer electrical charges from said body to said conveying means at a plurality of exit portions of said conveying means.

25. The invention as set forth in claim 22, characterized by the fact that the means for transferring electrical charges serves to transfer electrical charges from said conveying means to said body at a plurality of entering portions of said conveying means and to remove electrical charges to said conveying means from said body at a plurality of exit portions thereof.

26. An electrostatic machine having a body to be charged, and movable charge conveying means for transferring electric charges between said body and said conveying means, said conveying means having a plurality of looped portions within said body.

27. In an electrostatic apparatus, the combination with a body to be charged, of a hollow insulating tube supporting said body, and a moving conveying medium for transferring electric charges to said body having a path of movement within said insulating tube.

28. In an electrostatic apparatus, the combination with a body to be charged, of a traveling charge conveying medium operatively related thereto, and means for causing a transference of electric charges to said medium comprising a source of sustained voltage independent of said medium and opposed terminals between which said medium travels, one of which is connected to said voltage source, said terminals providing one a region of relatively high potential gradient and the other a region of relatively low potential gradient.

29. An electrostatic apparatus, comprising a hollow body to be charged, insulating means spacing the same from ground, an endless charge conveyor with means for causing the travel of the same into and out of said body, means for applying electric charges to said conveyor at a point outside of said body, an electrode within and insulated from said body for removing electric charges from the entering portion of said conveyor, a terminal connected to said electrode and presenting a relatively extended surface positioned adjacent the departing portion of said conveyor, and an electrode connected to the interior of said hollow body and positioned adjacent said departing portion and opposite said terminal, thereby to place charges on the departing portion of a sign opposite that of the charges brought to said body by said conveyor.

30. In a high voltage electrostatic apparatus, the combination with an electrode comprising a hollow body of rounded contour, of means for charging the same to an abnormally high voltage, said body having an opening in its surface, the bounding edges of said opening having a rounded re-entrant contour, and a member entering the opening in said body.

31. In an electrostatic apparatus, the combination with a body to be charged, of a charge-conveying medium, means for applying electric charges to said medium, and means for transferring charges from said medium to said body, including charge collecting means operatively related to said body and comprising conducting terminals of opposite polarity and an independent source of voltage for exciting said terminals.

32. In an electrostatic charging system, the combination with a pair of terminals, of electrostatic means for creating a high potential difference between said terminals, an evacuated tubular member structurally connected to one of said terminals, and means within the tubular member for completing a path of current from one terminal to the other.

33. An electrostatic machine comprising a hollow body constituting an electrode-terminal, on the surface of which a high potential charge is to be established, a movable charge carrier having a looped portion thereof located within said body and entering and leaving the latter, and means substantially wholly within said hollow body for transferring charges between said charge carrier and said body.

34. In an electrostatic machine, the combination with a body to be charged, of movable charge conveying means having entrance into and exit from said body, and means for transferring charges of one sign to said body from the charge conveying means on entrance therein and for removing charges of the opposite sign to said charge conveying means on exit therefrom.

35. In an electrostatic machine, the combination with a body to be charged, of an endless charge conveying belt having a movement into and out of said body, means for transferring charges from an entering portion of said belt to said body, and means for removing charges of an opposite sign from said body to a departing portion of said belt.

36. In an electrostatic machine, the combination with a body to be charged, of a movable charge conveying medium having a path of movement into and out of said body, means for transferring charges from said medium to said body on entering the latter, and means for transferring charges of the opposite sign to said medium from said body on leaving the latter.

37. In an electrostatic apparatus, the combination with a hollow body to be charged, of an endless conveying medium having a path of movement into and out of said body, means for transferring charges from an entering portion of the medium to said body, and means for removing charges of the opposite sign from said body to a departing portion of said medium, both said transferring and said removing means being substantially wholly within said hollow body.

38. In an electrostatic machine, the combination with a body to be charged, of endless charge conveying means for carrying electric charges to and into said body and having portions traveling in closely adjacent parallel paths, and a solid elongated insulating body lying between said parallel portions.

39. In an electrostatic power transmission system, the combination with an electrode body, of means for charging the same electrostatically to a high potential, a second electrode body insulated from ground adapted to be electrically connected to said first body to receive current therefrom, and an endless charge carrier having a path of movement into and out of said second electrode body with means for the transfer of electric charges between said second body and the ground to operate said charge carrier as a motor.

40. In high voltage electrostatic apparatus, a vertically disposed insulating column, a hollow electrode supported at the top of said column, an endless charge carrier and means for moving the same between a point near the base of said column and the interior of said hollow electrode, means for applying electrical charges to a portion of said carrier at a point remote from said electrode, and means within said hollow electrode for removing said electrical charges from said carrier.

41. In an electrostatic machine, a hollow body of rounded contour constituting an electrode-terminal on the surface of which a high potential charge is to be established, insulating means supporting said electrode, a pulley within and substantially surrounded by said body, an endless charge carrier comprising a belt having a loop passing about said pulley and entering and leaving said body, and means for driving said charge carrier.

42. In an electrostatic apparatus, the combination with a pair of spaced hollow bodies constituting each an electrode-terminal on the surface of which a high potential charge is to be established, of insulating means supporting said bodies, traveling charge-carrying means for carrying electric charges of one sign to and into one of said electrodes and charges of the opposite sign to and into the other of said electrodes, and means substantially wholly within and surrounded by each of said electrodes for transferring to the said electrodes electric charges brought thereto by said charge-carrying means.

43. In an electrostatic apparatus, the combination with a pair of spaced hollow bodies constituting each an electrode-terminal on the surface of which a high potential charge is to be established, of insulating means supporting said bodies, traveling charge-carrying means for carrying electric charges of one sign to and into one of said electrodes and charges of the opposite sign to and into the other of said electrodes, means substantially wholly within and surrounded by each of said electrodes for transferring to the said electrodes electric charges brought thereto by said charge-carrying means, and means for establishing a predetermined path of current transference between the electrodes comprising a vacuous casing connected to and extending between said electrode-terminal bodies.

44. In an electrostatic apparatus, the combination with a pair of spaced hollow bodies constituting each an electrode terminal on the surface of which a high potential charge is to be established, of insulating means supporting said bodies, traveling charge-carrying means for carrying electric charges of one sign to and into one of said electrodes and charges of the opposite sign to and into the other of said electrodes, means substantially wholly within and surrounded by each of said electrodes for transferring to said electrodes electric charges brought thereto by said charge-carrying means, means for establishing a predetermined path of current transference between the electrodes comprising a vacuous casing connected to and extending between said electrode terminal bodies, and a power-consuming device located in said path of current transference.

45. In a high voltage electrostatic apparatus, the combination with a hollow body constituting an electrode-terminal on the surface of which a high potential charge is to be established, of a moving charge-conveying insulating medium having a path of movement entering and leaving said body, means for applying charges to said medium at a point remote from said body, and means substantially wholly within and enclosed by said body for removing charges from said medium within said body, said charge-conveying medium being of substantially uniform insulating properties thereby to prevent concentration of the electric field along its path and to suppress corona discharges.

46. In an electrostatic machine, the combination with a body to be charged, of a movable charge-conveying medium for carrying charges to and from said body, and charge transferring means substantially surrounded by the equipotential surface of said body for transferring a charge of one sign from said medium to said body and for removing a charge of the opposite sign from said body to said medium.

47. In an electrostatic machine, the combination with a body to be charged, of a movable charge-conveying medium for carrying charges to and from said body, and charge transferring means substantially within said body for transferring a charge of one sign from said medium to said body and for removing a charge of the opposite sign from said body to said medium.

48. In an electrostatic machine, the combination with a body to be charged, of a movable charge-conveying medium for carrying charges to and from said body, and charge transferring means operating independently of and unaffected by the potential of said body for transferring a charge of one sign from said medium to said body and for removing a charge of the opposite sign from said body to said medium.

49. In an electrostatic machine, the combination with a body to be charged, of a movable charge-conveying medium for carrying charges between said body and a point remote therefrom, and charge transferring means independent of and unaffected by the potential of said body for transferring to said medium at said point a charge of one sign and for removing from said medium at said point a charge of the opposite sign.

50. The combination with a body charged to a high potential, of a movable charge-conveying medium operatively related to said body, and means for operating said charge-conveying medium as a motor including means for transferring charges of one sign from said medium to said body and for removing charges of the opposite sign from said body to said medium, said charge transferring and removing means operating independently of and unaffected by the potential of said body.

51. In an electrostatic apparatus, the combination with a movable charge-conveying medium, of charge transferring means operatively related thereto, and continuous charge supplying means including an electro-magnetic source of power therefor.

52. An electrostatic apparatus comprising a movable charge-conveying medium, charge transferring means operatively related thereto, and electro-magnetic means for providing continuous, steady excitation for said transferring means.

53. In an electrostatic machine, the combination with a body to be charged, of a charge-conveying medium having a path of movement between said body and a point remote therefrom, and a casing in which said medium is contained and of which said body forms an essential part.

ROBERT J. VAN DE GRAAFF.

CERTIFICATE OF CORRECTION.

Patent No. 1,991,236. February 12, 1935.

ROBERT J. VAN de GRAAFF.

It is hereby certified that error appears in the printed specification of the the above numbered requiring correction as follows: Page 4, second column, line 69, claim 9, for "receptivity" read resistivity; and that the said Letters Patent should be read with this correction therein that the same may conform to the record of the case in the Patent Office.

Signed and sealed this 12th day of March, A. D. 1935.

Leslie Frazer (Seal) Acting Commissioner of Patents.